No. 833,590. PATENTED OCT. 16, 1906.
W. W. DOOLITTLE.
MULTIPLE DRILL.
APPLICATION FILED NOV. 19, 1903.

Witnesses:
Chas. H. Ebert
Hermann Lochner

Inventor:
William W. Doolittle
By Paul Synnestvedt
Att'y

No. 833,590. PATENTED OCT. 16, 1906.
W. W. DOOLITTLE.
MULTIPLE DRILL.
APPLICATION FILED NOV. 19, 1903.

Witnesses:
Chas. H. Ebert
Hermann Lochner

Inventor
William W. Doolittle
By Paul Synnestvedt
Att'y

No. 833,590. PATENTED OCT. 16, 1906.
W. W. DOOLITTLE.
MULTIPLE DRILL.
APPLICATION FILED NOV. 19, 1903.

Witnesses:
Chas. H. Ebert
Hermann Lechner

Inventor
William W. Doolittle
By Paul Synnestvedt
Atty.

No. 833,590. PATENTED OCT. 16, 1906.
W. W. DOOLITTLE.
MULTIPLE DRILL.
APPLICATION FILED NOV. 19, 1903.

Witnesses:
Chas. H. Ebert

Inventor
William W. Doolittle
By Paul Synnestvedt
Att'y

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

MULTIPLE DRILL.

No. 833,590. Specification of Letters Patent. Patented Oct. 16, 1906.

Application filed November 19, 1903. Serial No. 181,764.

*To all whom it may concern:*

Be it known that I, WILLIAM W. DOOLITTLE, a citizen of the United States, residing at Chicago, in the State of Illinois, have invented certain new and useful Improvements in Multiple Drills, of which the following is a specification.

My invention relates particularly to machinery for drilling a series of holes simultaneously, and to improvements in means for rotating the drills and in arrangements for readily shifting them, to adjust the position of the holes, et cetera. The objects of the invention are, to provide a drill element which embraces in one compact movable part a motor and means for driving the drill from the motor, said drill element being shiftable to arrange the position of the drill; to provide a conveniently arranged series of said drill elements for accurate and efficient operation; to provide a superior means for driving the drill by an electric motor; to provide improved means for advancing the work against a series of drills; to provide superior electrically operated mechanism for manipulating both the work and the drills, and to generally improve the structure and operation of machines for multiple drilling.

The above objects, together with other advantages which will hereinafter appear, I attain by means of the mechanism illustrated in preferred form in the accompanying drawings, wherein—

Figure 1:
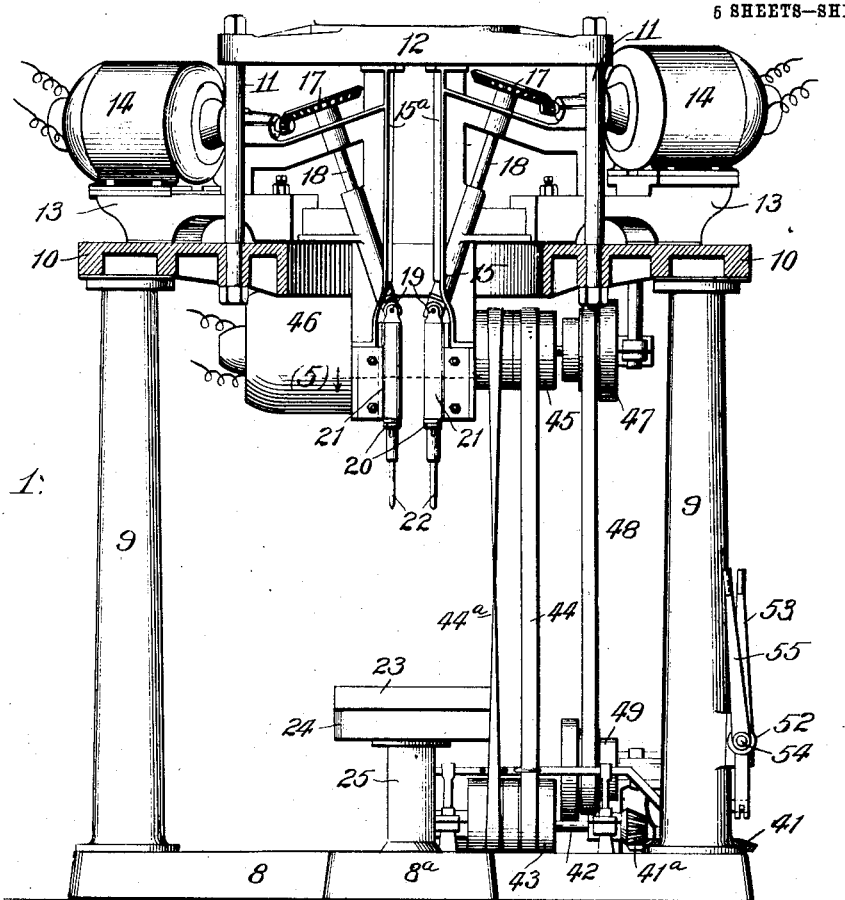
Figure 1 is a front elevation and partial section of the entire machine.

In the machine as arranged for illustration and shown in the accompanying drawings, it will be observed that on the base 8 I provide a pair of upright posts 9 which at their top carry a circular flat table ring 10 upon which are seated the drill elements to be hereinafter described. Two posts 11 rise from convenient points on the top of the table 10 and on their upper ends they carry an abutment plate 12, which is thus rigidly fixed to the table ring 10.

Figure 4:
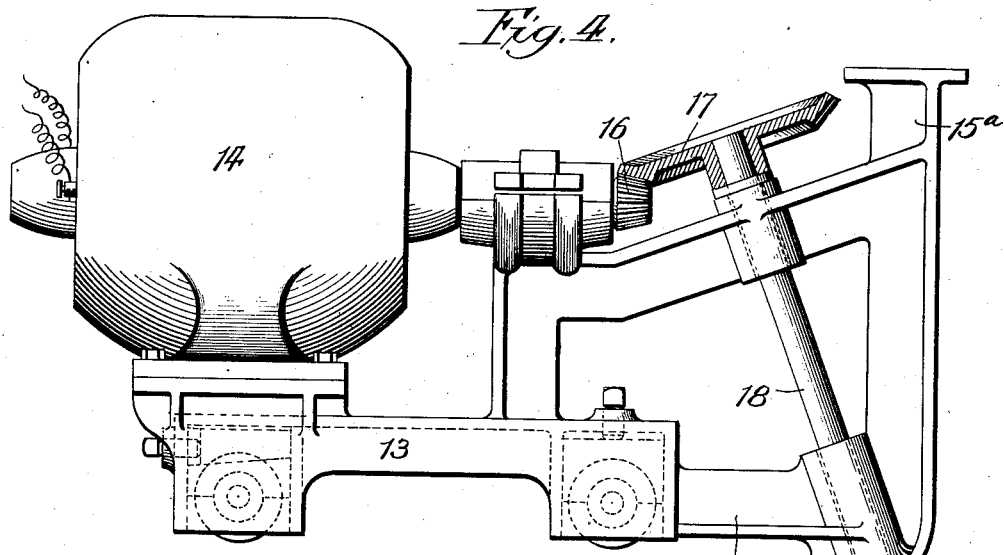
Figure 4 is an enlarged side elevation of the drill element.
Figure 5:
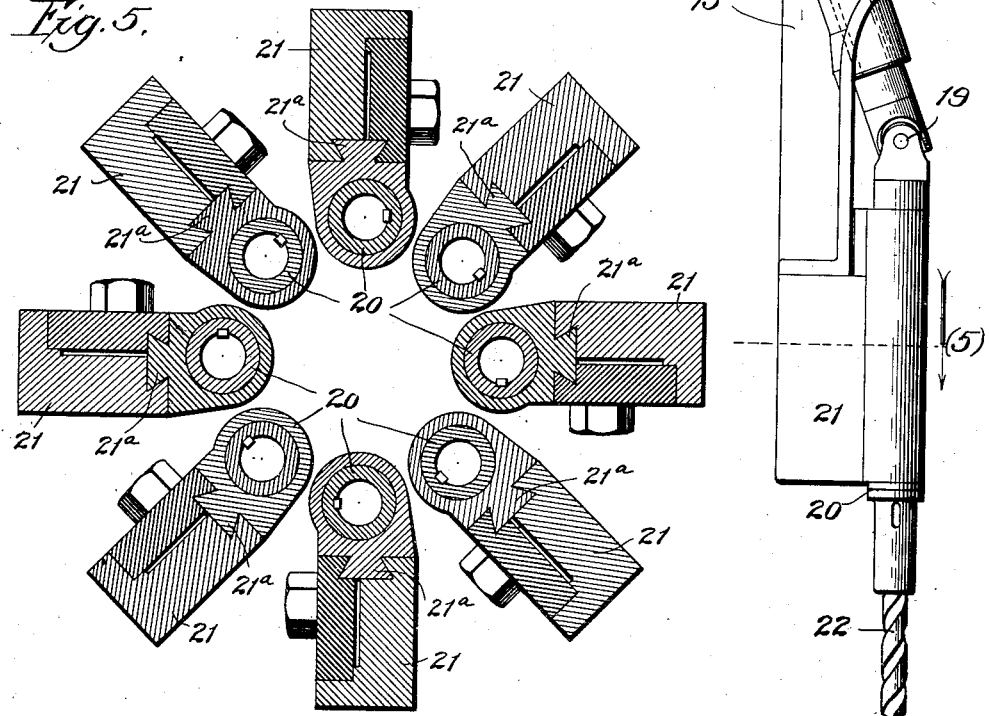
Figure 5 is a horizontal cross section of the drill holders, on line (5) of Figures 1 and 4.
Figure 6:
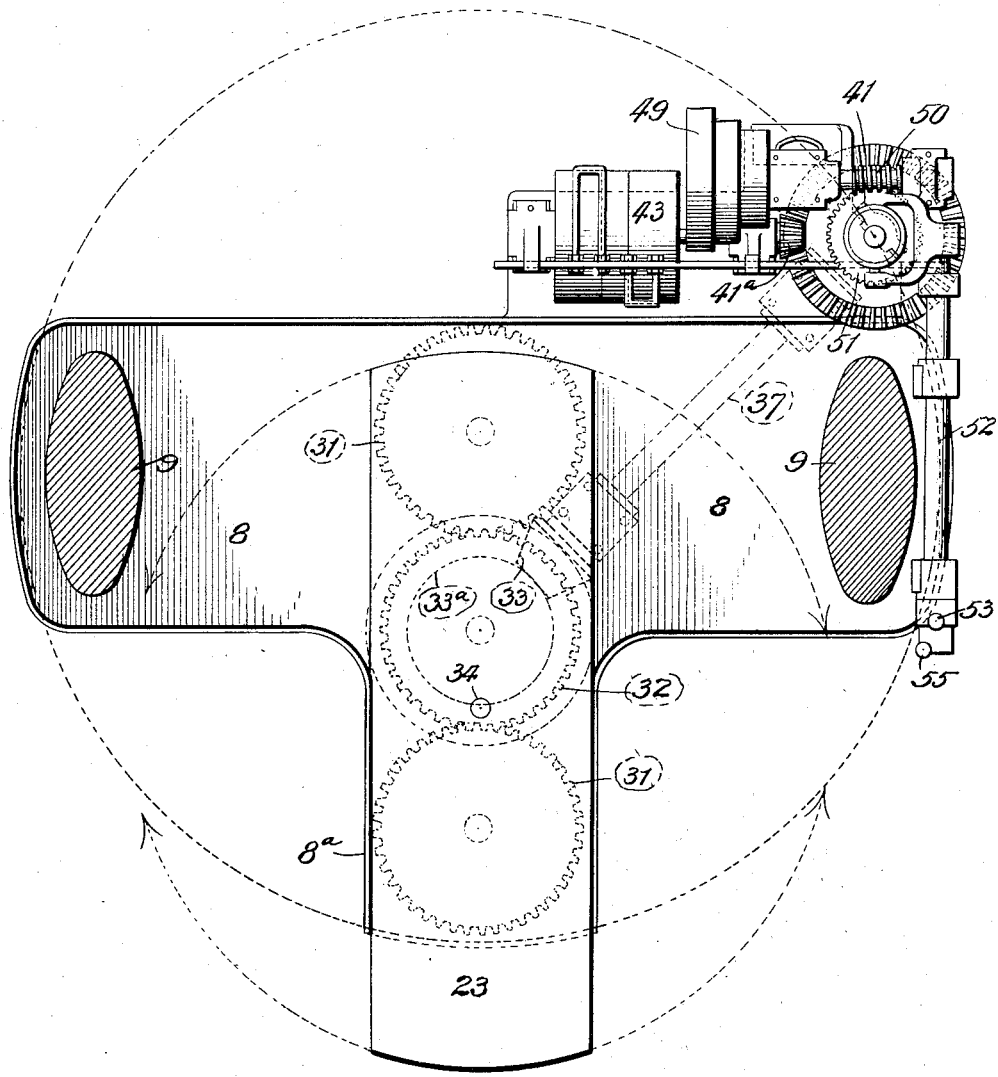
Figure 6 is a plan view of the base of the machine and the shiftable table for carrying the work and a more detailed view of the mechanism for raising and lowering the table.

On the top of the table 10 I arrange any desired number of drill elements, so as to be movable thereon. These elements, as shown in Figure 4, consist of the base 13 carrying an electric motor 14 which is seated upon the rear end of the base 13 and this latter has a rigid forwardly projecting frame portion 15. The spindle of the motor carries the gear 16 which by means of the gear 17 drives the shaft 18 which extends downward and through the lower portion of the frame 15, and by means of a universal joint 19 is attached to the revolvable drill chuck 20 carried in the head 21 and driving the drill 22 projecting vertically therefrom. The motor 14 may be driven by means of current introduced by wires from overhead. Otherwise, as will be understood, a different kind of motor may be used in place of the electric motor 14,—this not being a necessary part of my invention, as respects the general organization of the machine.

It will be seen that there is a large opening at the center of the table 10 and that each one of the drill elements projects downward therethrough to hold the drill 22 at proper position to operate upon the work and that the upward pressure upon the drill is taken by means of the thrust post 15ª directly against the overhead abutment plate 12 which is held rigid on table 10 by means of the rods 11 as heretofore described. Thus the gearings are not subjected to any of the thrusting strain, as this is taken directly from the drill points to the abutment. The work in this case is advanced against the drills, which are stationary in vertical height, and for moving the work I provide the vertically movable rotary table 23 which rests upon a base 24 borne upon two reciprocating posts 25 which move vertically to advance the work against the drills.

Figure 2:
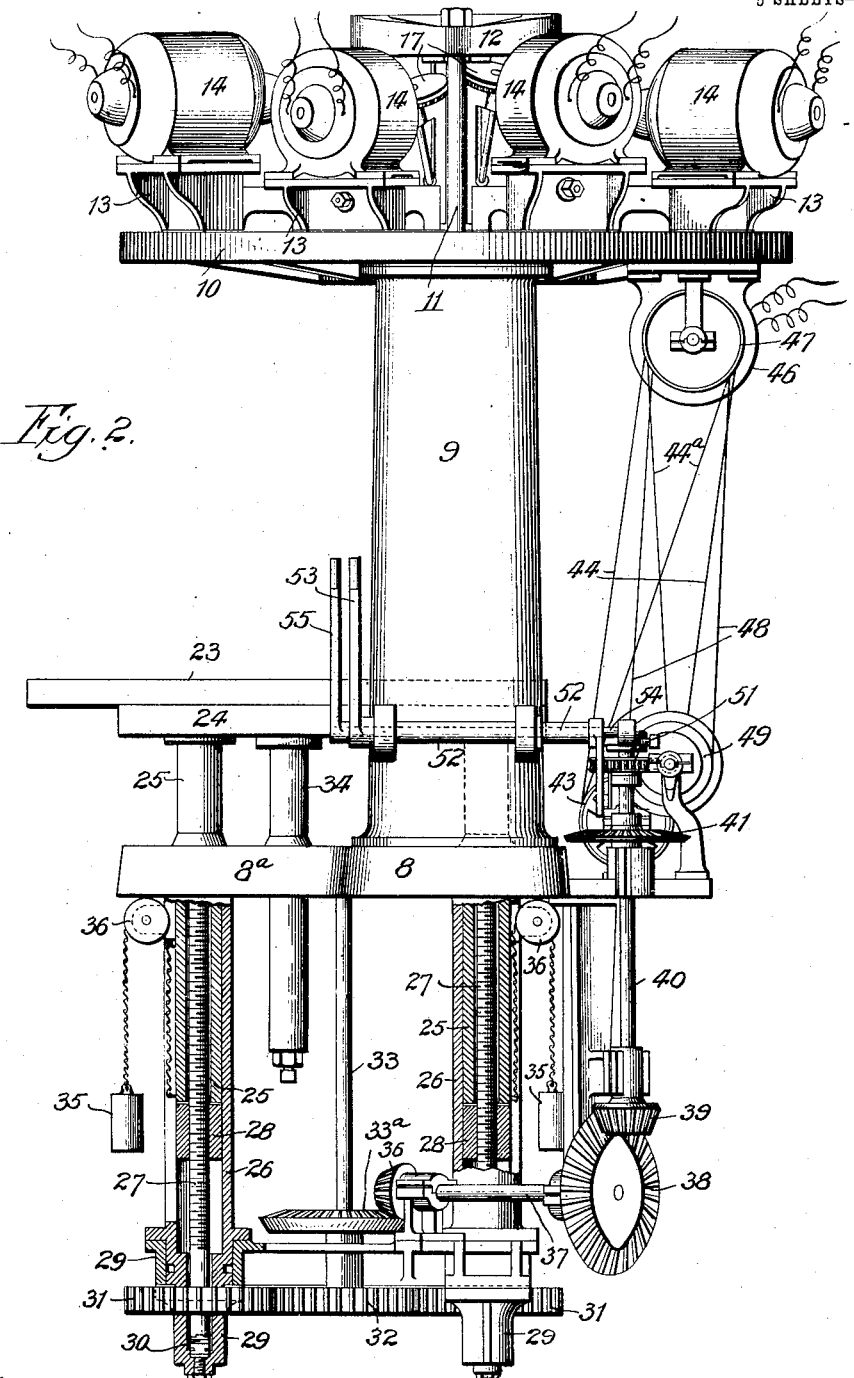
Figure 2 is a side elevation of the machine taken at right angles to the view of Figure 1, and showing in section the mechanism for raising and lowering the table.
Figure 3:
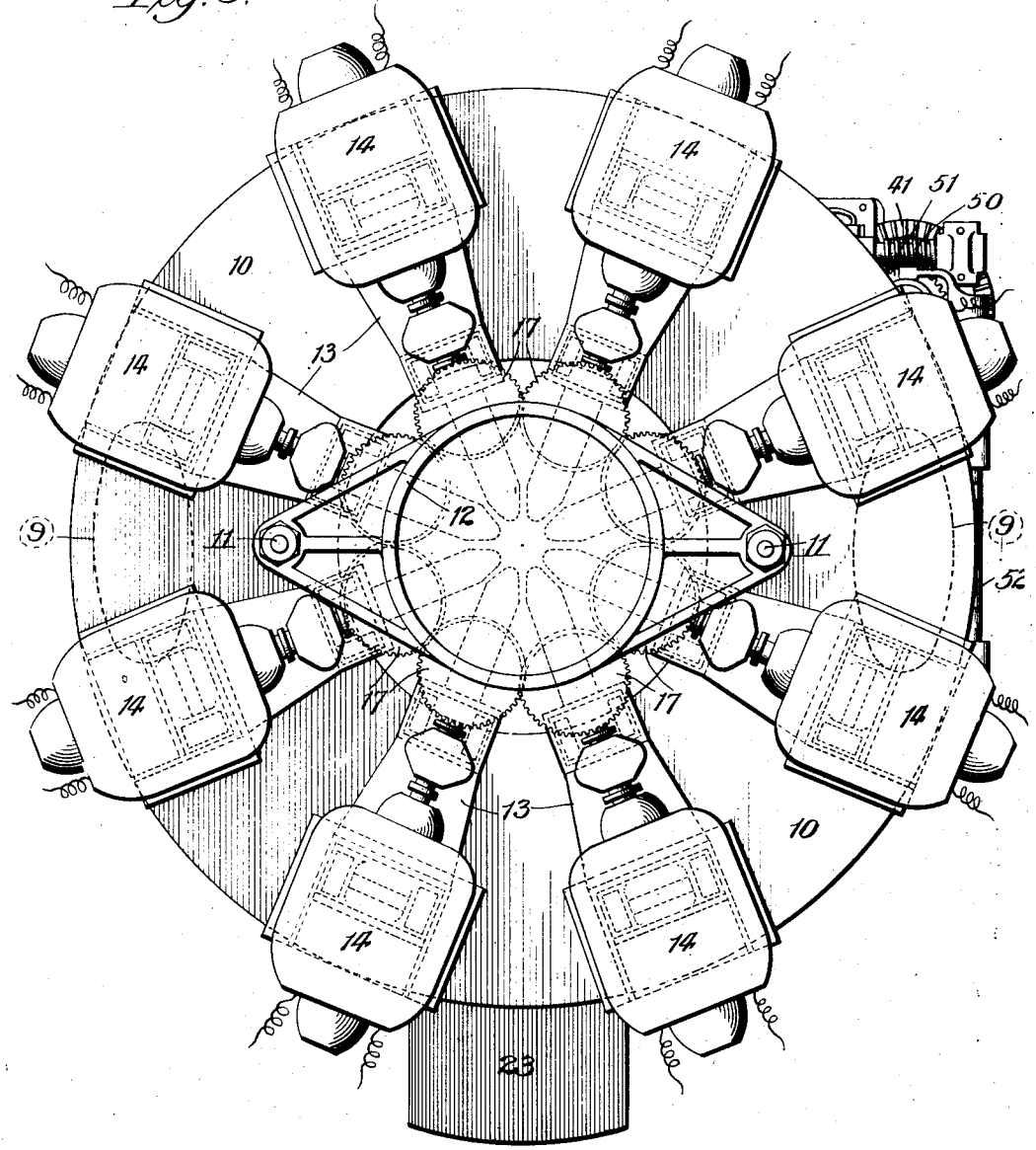
Figure 3 is a plan view of the machine, the drill chucks being shown by dotted lines as arranged in circular position.

Projecting downward from the base 8 of the machine, which is preferably made flush with the floor line, are two tubes 26 within which the hollow posts 25 reciprocate. Within the posts 25 and working through nuts 28 which support posts 25 are vertical screws 27 which at the bottom are journaled in the bracket 29 resting on the bearings 30 (Figure 2). The screws are driven by gears 31 which mesh with the gear 32, on the shaft 33. There are preferably two of these screws 27, and between the two, near the center of the table is provided a guide and pivoting sleeve and rod 34. The weight of the table is counterbalanced by weight 35 suspended from pulley 36, by a chain attached to post 25. The shaft 33 with its gear 33$^a$ is driven by a gear on the shaft 37 and this in turn by the gears 38 and 39 through the shaft 40 and the gear 41.

In cases where it is desired to operate the screws 27 rapidly for initially adjusting the table, this gear 41 is driven by the gear 41$^a$ and the shaft 42, which is driven directly by pulley 43 and the belts 44, 44$^a$, in either direction desired, from the pulleys 45 on the shaft of the motor 46 suspended from the table 10, as will be apparent from Figure 1. The belts 44 for throwing gear 41 into operation to turn shaft 40 rapidly, are operated by sleeve 52 through the lever 53.

For slower motion of the screws 27 and the advancing of the table 23 against the work, the shaft 40 is preferably driven by means of the worm 50 which engages gear 51 on the same shaft 40 and is itself driven by means of pulleys 49 and belt 48 from pulley 47 on the shaft of the motor 46. A clutch for throwing the gear 51 into mesh is operated by rod 54 having handle 55. There are provisions, as will be understood, for changing the direction of motion of the screws 27 and for several variable speeds thereof.

In order to allow of a greater range of movement of the drill elements on top of the table 10 and of the motors being brought closer to each other, I make every alternate one of the frames 15 of less height than the neighboring ones on the two sides, and arrange the positions of gears 17 correspondingly, as will be seen in Figure 1. By this arrangement the motors may be brought very close to each other and a larger range of radial movement is provided in order to group the drills upon the work as may be desired, which also permits the use of a larger gear than could otherwise be utilized. It will be understood that the table 23 is pivoted on its support 24, and swings about the post 34 as a center, to adjust the work. The wires from the various motors may be grouped together and all operated by a single rheostat.

Figure 7:
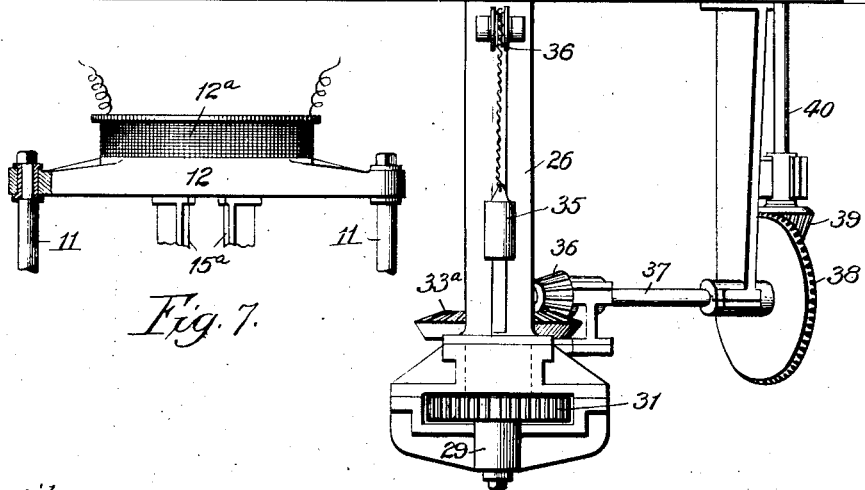
Figure 7 is a modification of the abutment plate.

In Figure 7 I have indicated a modification in which the abutment plate 12 is provided with a coil 12$^a$ and is magnetized so as to attract the heads of the posts 15$^a$ of the several drill elements and thus anchor them in place during the drilling. They may be released by demagnetization when it is desired to move them. The many advantages of these devices will readily occur to those familiar with the art.

Having thus described my invention and illustrated its use, what I claim as new, and desire to secure by Letters Patent, is the following:

1. A multiple drill comprising a work table and means for moving it, a back thrust abutment, a support, and a series of independently movable unattached drill elements movable thereon between the abutment and the table, each of said elements comprising a separate motor and drill with gearing between them.

2. A multiple drill comprising a movable table and means for moving it, and a series of drill elements independently movable in several directions over the table and arranged to operate thereon, each of said drill elements carrying within itself a motor and complete drill gear.

3. In a multiple drilling machine the combination of a resistance abutment, a support, and an independently movable unattached drill element comprising a motor mounted in a frame, a series of gears driven by the motor and carried entirely within said frame, and a drill chuck also carried in the frame, the whole of the connected devices being unattached from the machine and bodily movable on the support under said resistance abutment.

4. In a multiple drilling machine, an independently movable drill element comprising a motor mounted in a frame, a series of gears driven by the motor and carried entirely in said frame, and a drill chuck also carried in said frame, the whole of the connected devices being unattached and bodily movable, the machine having also a support for the drill elements and means for receiving the back thrust upon the drill.

5. In a multiple drill the combination with a carrying table and an abutment plate, of an unattached independently movable drill element comprising a motor and a frame carrying a rotary drill, gearing to connect the motor and the drill, all mounted in one rigid frame, and the thrust of the work against the drill being taken up by said abutment plate, and means by which the work is advanced against the drill.

6. The combination with a set of unattached and independently movable drill elements each containing driving means, of a common abutment for taking up thrusts upon the several drills, and a movable table and means for moving it against the drills 7. The combination with a reciprocating work table, of an unattached and independently movable frame carrying a motor, a drill and connecting mechanism, and an abutment plate to take up directly the upward thrust on the drill.

8. In a multiple drill, a series of drill elements comprising each a separate electric motor, a drill and connecting gearing, the said drill elements being movable at will and having magnetic means for holding them in place in the machine.

9. In a multiple drill having a series of independently movable self-contained drilling elements, a movable table for support of the work and an abutment plate to take up the thrust of the drills, being provided with a magnet to anchor said elements in position on said plate during the drilling operation.

10. In a multiple drill the combination of a rigid frame, an electric motor mounted thereon, a drill chuck carried on the frame and a direct gear, including a shaft with a universal joint, between the motor and the drill chuck, all the parts being carried on and movable with the single frame combined with a supporting table and a back thrust abutment, between which parts the drill frame may be moved freely in any direction.

11. An independently movable drill element comprising a rigid frame, an electric motor fixed horizontally thereon, a vertically arranged drill chuck on the frame, a shaft geared to the motor shaft and outwardly inclined therefrom, and a universal joint connecting the shaft and the drill chuck.

12. In a drilling machine, a supporting table, a drill element independent of the table and movable bodily thereon and comprising a drill spindle and a body portion carrying a drive shaft connected to the drill spindle, and means above the drill element adapted to take the back thrust therefrom.

In testimony whereof I have hereunder signed my name in the presence of the two subscribed witnesses.

WILLIAM W. DOOLITTLE.

Witnesses:
PAUL CARPENTER,
EDWARD C. BURNS.